(12) United States Patent
Ledbetter

(10) Patent No.: US 8,063,323 B1
(45) Date of Patent: Nov. 22, 2011

(54) CIRCUIT BREAKER REPLACEMENT TOOL

(76) Inventor: Finley L. Ledbetter, Argyle, TX (US)

( * ) Notice: Subject to any disclaimer, the term of this patent is extended or adjusted under 35 U.S.C. 154(b) by 688 days.

(21) Appl. No.: 12/250,254

(22) Filed: Oct. 13, 2008

Related U.S. Application Data

(60) Provisional application No. 61/084,897, filed on Jul. 30, 2008.

(51) Int. Cl.
*H01H 9/00* (2006.01)

(52) U.S. Cl. .................. 200/50.21; 200/50.26; 361/605; 361/606; 361/607

(58) Field of Classification Search .... 200/50.21–50.26; 361/605–607; 29/622
See application file for complete search history.

(56) References Cited

U.S. PATENT DOCUMENTS

| | | | | |
|---|---|---|---|---|
| 4,713,501 | A * | 12/1987 | Herrmann | 200/50.22 |
| 5,330,213 | A * | 7/1994 | Peruso | 280/43.2 |
| 5,477,017 | A * | 12/1995 | Swindler et al. | 200/50.24 |
| 6,404,620 | B1 * | 6/2002 | Piccione | 361/601 |
| 6,777,627 | B1 | 8/2004 | Stevenson | |
| 6,897,388 | B2 * | 5/2005 | Greer | 200/200 |
| 6,951,990 | B1 * | 10/2005 | Miller | 200/50.21 |
| 7,019,230 | B1 * | 3/2006 | Vail et al. | 200/50.24 |
| 7,825,344 | B2 * | 11/2010 | Stevenson | 200/50.24 |
| 2003/0200648 | A1 * | 10/2003 | Greer | 29/622 |
| 2010/0024191 | A1 * | 2/2010 | Ledbetter | 29/428 |

\* cited by examiner

*Primary Examiner* — J. Allen Shriver, II
*Assistant Examiner* — James Triggs
(74) *Attorney, Agent, or Firm* — Buskop Law Group, PC; Wendy Buskop

(57) ABSTRACT

A circuit breaker replacement tool made of a cart with a base plate, wherein the base plate has at least two wheels. The cart has a right side and a left side with both sides connected on one end to the base plate. A height adjustable support arm holds a main linear actuator and an interlocking linear actuator for opening interlocks and installing or removing circuit breakers from circuit breaker cabinets.

15 Claims, 7 Drawing Sheets

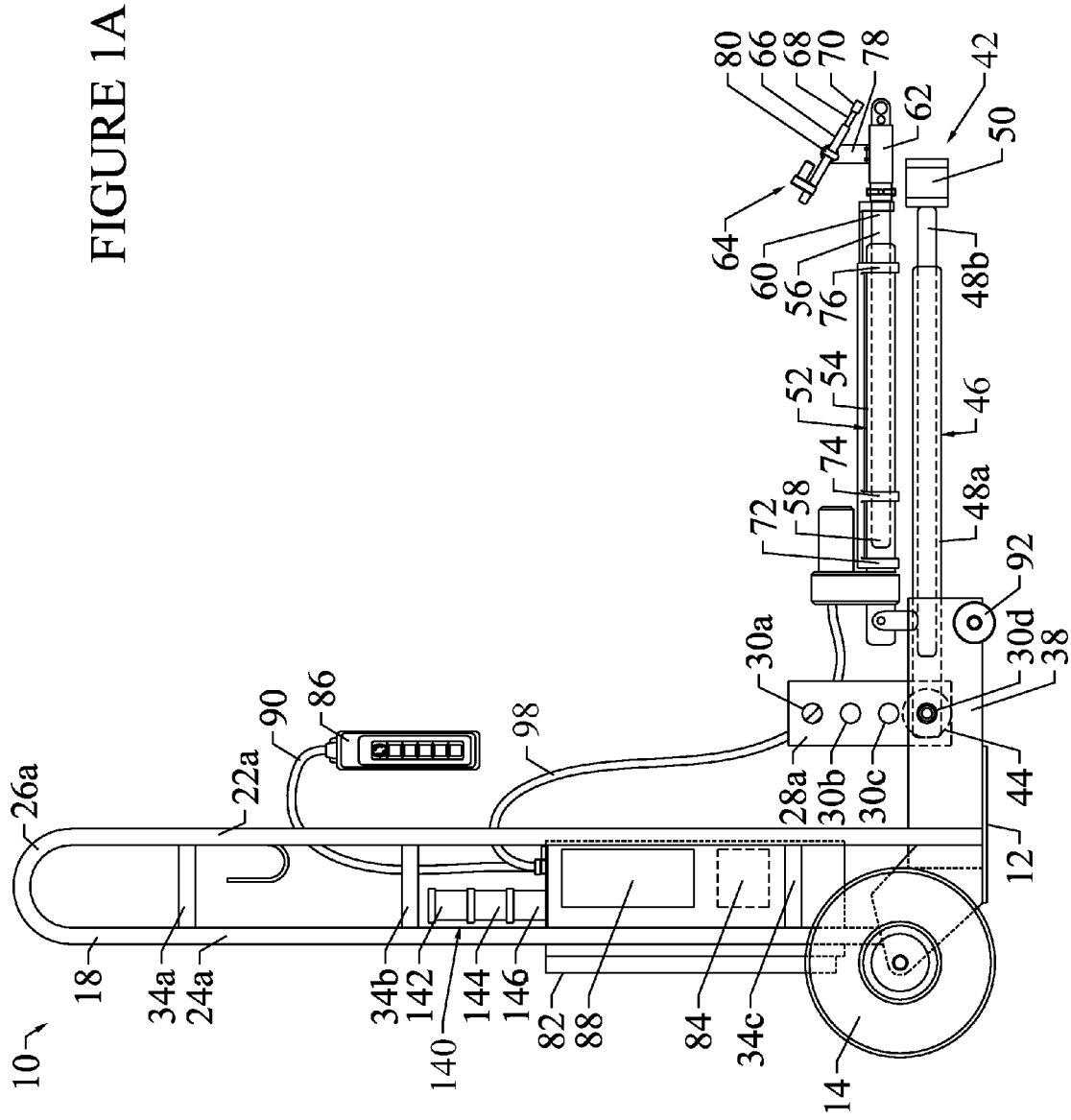

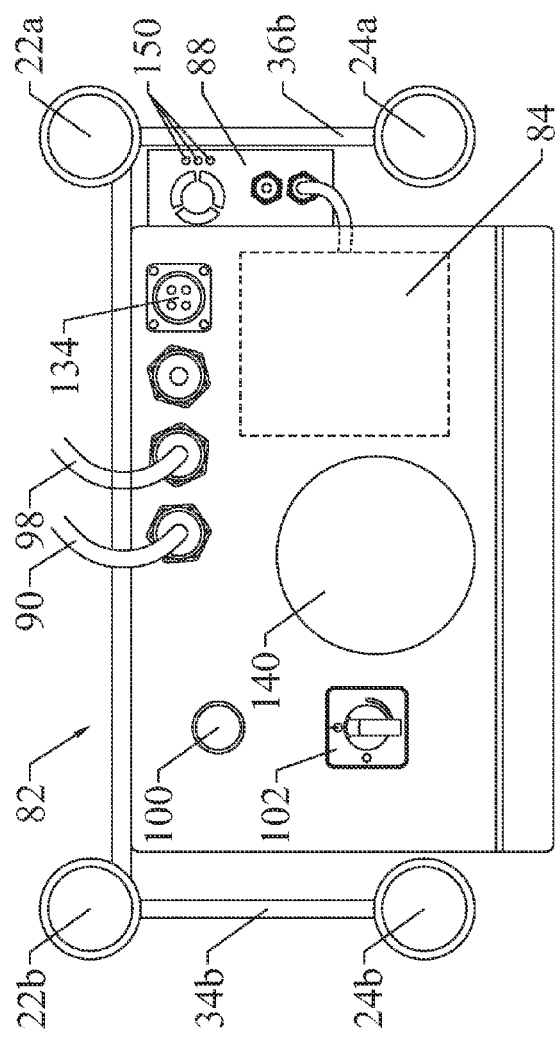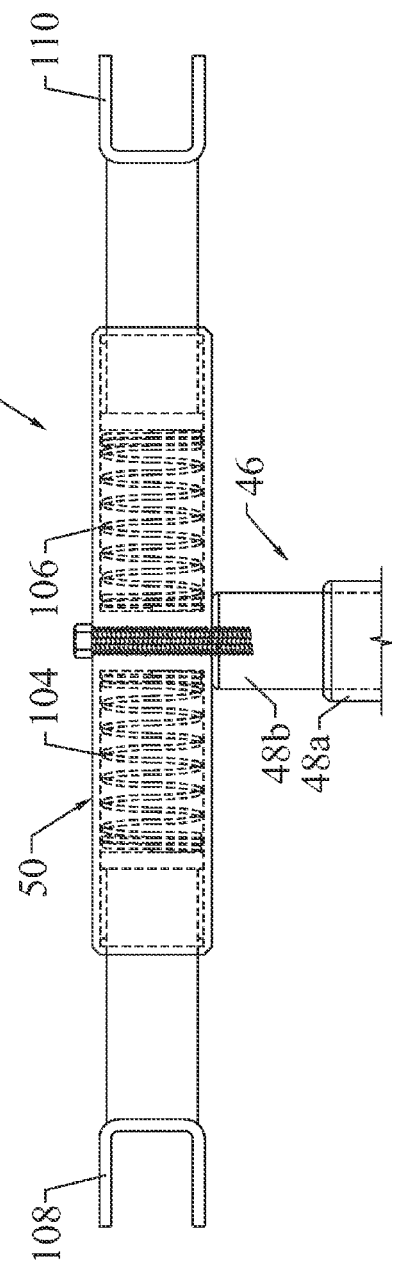
FIGURE 2
FIGURE 3

CIRCUIT BREAKER REPLACEMENT TOOL

RELATED APPLICATIONS

This application claims priority to and is a continuation in part of Provisional Application Ser. No. 61/084,897 filed on Jul. 30, 2008, and entitled "Circuit Breaker Replacement Tool," the full disclosure of which is incorporated herein by reference.

FIELD

The present embodiments relate to a tool for automatically inserting and removing circuit breakers from circuit breaker cabinets and more specifically to a remote control tool for automatically inserting and removing circuit breakers providing increased operator safety.

BACKGROUND

Arc-flash is the result of a rapid release of energy due to an arcing fault between a phase bus plate and another phase bus plate, a neutral or a ground.

During an arc fault, the air is the conductor that creates an arc similar to an arc obtained during electric welding. The arc fault is typically manually started by a failure along the path of conduction, such as a breakdown in insulation.

The cause of the short often burns away during the initial flash. The arc flash is then sustained by the establishment of highly conductive plasma around the fault.

The plasma will conduct as much energy as is available limited only by the impedance of the arc. This massive energy discharge burns the bus plates, vaporizes the copper and causes an explosive volumetric increase. The arc blast, conservatively estimated, has an expansion of 400,000 to 1. This fiery explosion devastates everything in its path creating deadly shrapnel as it dissipates.

Several incidents have occurred in recent years which have resulted in injury and death due to these arc blasts.

The majority of arc blast incidents occurred while a circuit breaker was being installed or removed from a circuit breaker cabinet. Since removing and installing circuit breakers requires a user to be in close proximity to switchgear being installed, and on some occasions to be physically in the circuit breaker cabinet itself, it is a highly hazardous activity and a need has existed for this activity to be done by remote control or by a remotely controlled robot or similar tool.

A need has existed for a specialty installation tool designed for safety and reliability protecting a user from the deadly arc blast.

A further need exists for an attachment for, or component of, the specialty installation tool for actuating interlocks, handles, or levers required for engaging and disengaging circuit breakers from their circuit breaker cabinets. A common interlock found in circuit breakers is a foot lever interlock. Ordinarily, this interlock requires an operator to manually push the lever with their foot while they pull the circuit breaker out of the circuit breaker cabinet. Therefore, a need exists for a device to remotely actuate interlocking levers and pull the circuit breakers out of the circuit breaker cabinet for operator safety.

A further need exists for an attachment for, or component of, the specialty installation tool for securing the tool to the cabinet to help establish the relative motion between the circuit breaker and the circuit breaker cabinet.

The present embodiments meet these safety and reliability needs, prevents death, destruction and explosions for a user with a remotely operated vehicle that can install or remove circuit breakers from a cell of a circuit breaker cabinet.

BRIEF DESCRIPTION OF THE DRAWINGS

The detailed description will be better understood in conjunction with the accompanying drawings as follows:

FIGS. 1A and 1B are the right and left side views of the tool.

FIG. 2 is a top view of the control box.

FIG. 3 is a top view of the cabinet brace.

Figure 1B:
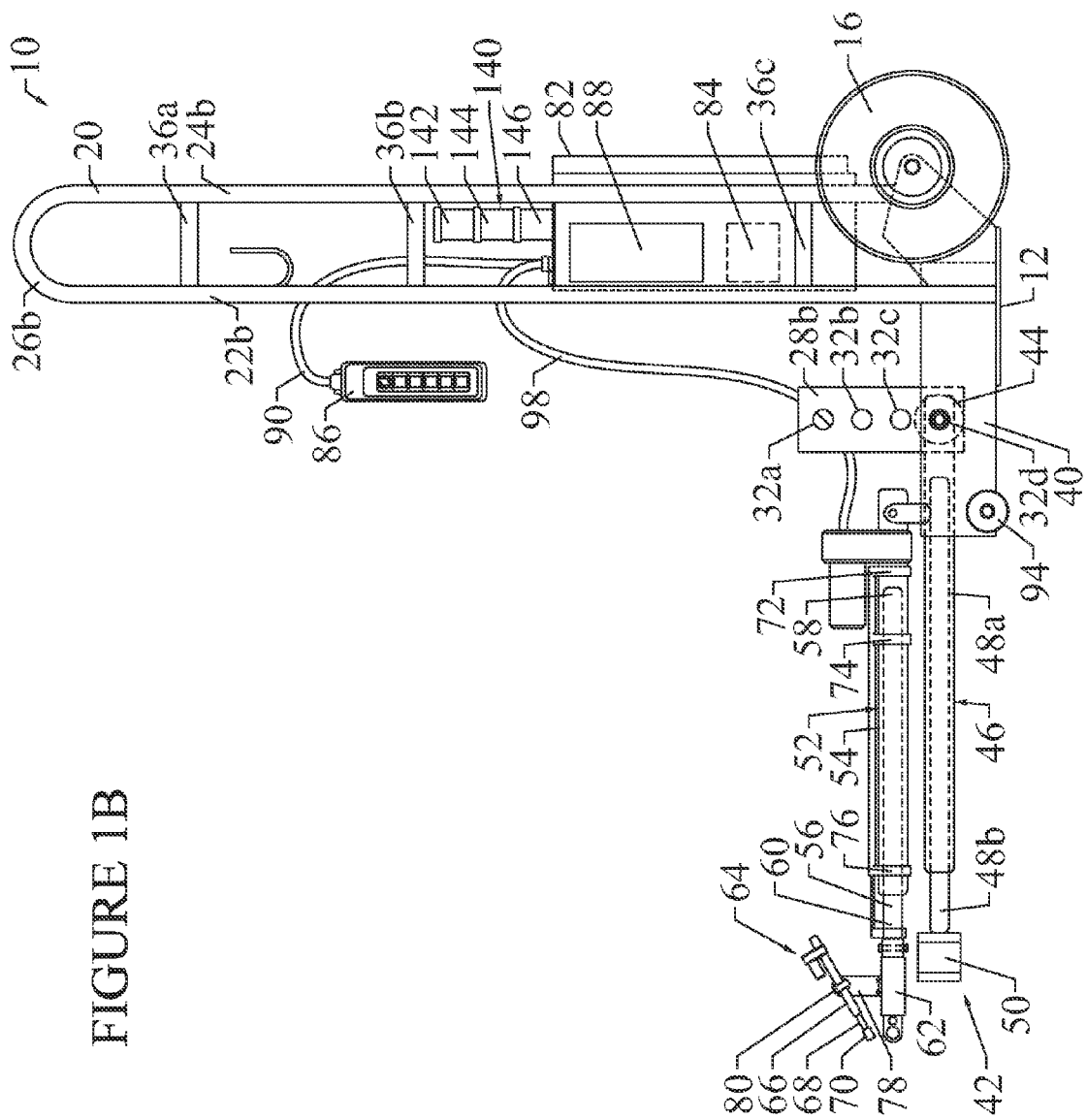

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments specifically set forth in the Figures and the detailed description and that it can be practiced or carried out in various ways.

The embodiments relate to a circuit breaker replacement tool which can handle circuit breakers of medium voltage. Medium voltage is construed to mean a voltage from about 2,500 volts to about 28,000 volts.

The embodiments can also be used to remove and install high voltage circuit breakers which can operate in voltages exceeding about 28,000 volts. A high voltage circuit breaker for European use, can be about 245,000 volts.

The embodiments can be used to install or remove a low voltage circuit breakers, wherein the voltage of the low voltage circuit breakers is less than the voltage of the medium voltage circuit breaker, such as between about 480 volts to about 2,400 volts.

The tool can be made up of several basic components, including a cart with wheels and at least one brake and a base plate, and handles for easy movement. The cart's base plate anchors a height adjustable support arm that can be adjusted to different vertical heights for supporting a main linear actuator at different heights for different cabinets.

The cart has a base plate of metal that can be coated to resist static charge build up, and has a size from about 18 inches to about 24 inches in width, from about 8 inches to about 16 inches in length, and a thickness from about ¼ inches to about ¾ inches.

In an embodiment the base plate can be made from powder coated steel. The base plate can be about 20 inches wide, about 18 inches long and about ¼ inches thick.

The base plate can be perforated to reduce the overall weight of the cart and can be resistant to static charge build up.

The cart can be made of tubular steel and can be coated, such as with a paint, to reduce ionic or static charges between the tool and the electric circuit breaker.

Tubular steel can be used to form the right side and left sides of the cart and can be from about 4 feet to about 6 feet tall connected to the base plate at one end. A hollow tube with an inner diameter from about ¼ inches to about 1 inch can be used as the tubular steel and allow for maximum rigidity while reducing materials cost over a solid tubular. Hollow tubes, rather than solid rods, provide the benefit of having lower weight during shipping and ease of movement around a plant floor, providing greater versatility.

Each side of the cart can be formed from a front tubular and a back tubular connected by at least two horizontally oriented braces which can be made up of a stiff plate of steel that can also be coated, or channel, or a similar metal. In another embodiment, plastic braces can be contemplated to reduce static charge build up and thus reduce the possibility of explosions.

Up to five braces can be used on each side to ensure a strong, rigid cart, able to support the weight of a drive assembly without deformation. In an embodiment, each brace can be from about 4 inches to about 8 inches long, from about 2 inches to about 4 inches wide, and from about $\frac{1}{8}$ inches to about $\frac{1}{2}$ inches thick. The brace can have holes drilled on each end to engage a fastener extending through the tubular for a secure engagement. Other fastening means can also be contemplated herein.

The frame can further have hooks attached at various locations for storing cables and other objects when the tool is not in operation.

In an embodiment, the wheels can be made with solid rubber tires over metal hubs. In another embodiment, the rubber tires can be natural rubber, synthetic rubber or steel reinforced tires.

A height adjustable support arm can be disposed between the right and left sides of the cart and can be pivotally affixed to swivel between an oriented parallel to the front and back tubulars and an orientation roughly perpendicular to the tubulars. The height adjustable support arm can further be lowered with the main linear actuator, and can be folded back into a compact configuration for transporting and storing the tool. The height adjustable support arm can be a solid rod, made of metal or a polymeric pipe. The height adjustable support arm can be non-deformable and resistant to static charge build up. The height adjustable support arm can be made of a material that resists deformation in the presence of high temperatures.

The height adjustable support arm supports a main linear actuator. The main linear actuator is the component of the tool that actually extends and retracts a circuit breaker relative to a the circuit breaker cabinet for installing or removing the circuit breaker. It is important that that the main linear actuator be roughly level with the base of the cabinet. The height adjustable support arm helps to keep the main linear actuator roughly parallel to the ground and at the same level as the base of the cabinet. The main linear actuator can be linear hydraulic actuator. The main linear actuator can be a linear actuator, like model LPF200M5.0VL-TK produced by Tsubaki-Emerson.

The main linear actuator can include a moveable shaft disposed partially within a housing. An adapter drive head can be mounted at the end of the movable shaft. The adapter drive head can comprise a bolt mounted to the movable shaft and a nut for engagement with the bolt. The adapter driver can have any configuration that can allow the adapter driver to form a secure connection with a circuit breaker. For example, the bolt can be run through a hole in a flange of the circuit breaker, and the two can be securely fastened together with a nut. The adapter drive can also be secured to the circuit breaker with a large pin.

The height adjustable support arm can be configured with a height adjusting connection rod, which allows the support arm to be adjusted to various heights. The height adjusting rod can be perpendicular to an extendable central rod and can have holes in its end which can be aligned with height adjusting holes on the right and left side plates for mounting at various heights.

A cabinet brace can be mounted at the end of the height adjustable support arm. The cabinet brace serves as a means for both keeping the main linear actuator level with the circuit breaker and as a means for holding the circuit breaker cabinet as the circuit breaker is being either installed or removed from the circuit breaker cabinet. The cabinet brace can be a bar or rod generally perpendicular to the movable shaft. The ends of the cabinet brace are configured for engaging a side wall or other support structure of the circuit breaker cabinet. The ends of the cabinet brace can be spring loaded to urge them outwards towards the circuit breaker cabinet or a circuit breaker cabinet support. The ends can also be "U"-shaped or some other shape to facilitate grabbing the circuit breaker cabinet.

An interlock linear actuator can be mounted with the movable shaft of the main linear actuator. The interlock linear actuator serves as a means for actuating interlocks, latches, or handles on the circuit breaker for engaging or disengaging the circuit breaker from circuit breaker cabinet. The interlock linear actuator provides an adjustable means for remotely actuating any such interlock for the same safety considerations previously described.

The interlock linear actuator can be affixed to the movable shaft so that it can be adjusted in three dimensions. This adjustability ensures that the interlock linear actuator can be adapted for various circuit breakers. Once adjusted to the proper position the interlock linear actuator can be remotely operated. The interlock linear actuator can contain a hydraulic motor for actuating a moving shaft. The interlock linear actuator can be a linear actuator such as model LPF04LK1.0V-TK made by Tsubaki-Emerson.

A control box can be used to power both the main linear actuator and the interlock linear actuator. The control box can contain a battery. The battery can be a 24 volt DC battery consisting of two 12 volt DC lead-acid batteries, which can be charged via a 120 volt AC power source. The power supply running the motor can be a fuel cell, lead-acid battery, such as a car battery, a lithium ion battery, or some other device, the critical feature being that the power supply is carried and mounted within the cart, so there are no loose wires to trip an operator or to conduct a charge of electricity to another source or user if the tool causes a short and arcing. The control box can be connected to each of the main linear actuator and the interlock linear actuator for their operation.

A hand control unit can be connected to the control box for operating each of the main liner actuator and the interlock linear actuator. The hand control unit can be connected to the cart and the control box by a 25 foot spiral cord. In the alternative, the hand control unit can be in wireless communication with control box. The hand control unit can be model number PF3060052-NPA made by Springer Controls. The hand control unit can have a plurality of buttons for actuating the tool, including an emergency stop, an installation button for extending the main linear actuator, a removal button for retracting the main linear actuator, and interlock linear actuator engaging button for extending the interlock linear actuator to engage interlocks, and an interlock disengage button to retract the interlock linear actuator.

In an embodiment, the cart can be an extruded aluminum support frame or a non-deformable polymeric cart.

In one embodiment the height adjustable support arm can be telescoping.

The main linear actuator, the adapter drive head, the interlocking linear actuator, the cabinet brace, and the height adjustable support arm, and the control box can be mounted to the cart forming the tool, which closely resembles a hand truck fitted with sturdy solid rubber tires. Once the tool is in place, the cabinet brace ensures the cart remains stationary during the installation or removal operations of the circuit breakers. The controls for each linear actuator in the device can be contained with a pendant-style hand control with a long cable, such as a 25 foot cable, allowing a user to be clear form potential dangers that exist when circuit breakers are not properly grounded.

The tool strongly reduces the risks associated with the operation of some industrial, high voltage circuit breakers that require an operator to remove or install circuit breakers.

A method of replacing a circuit breaker in a circuit breaker cabinet related to the apparatus described herein can include the steps of: securing a brace of the circuit breaker replacement tool to the circuit breaker cabinet; securing an adapter head of the circuit breaker replacement tool to the circuit breaker cabinet; adjusting an interlock linear actuator on the tool into alignment with an interlock or handle on the circuit breaker; actuating the interlock linear actuator to engage a interlock or handle on the circuit breaker; and actuating a main linear actuator connected to the adapter head to pull the circuit breaker out of the circuit breaker cabinet.

In another embodiment the step of adjusting the interlock linear actuator includes the steps of: adjusting the position of the interlock linear actuator along its own axis; adjusting the height of the interlock linear actuator; and pivoting the axis of the of the interlock linear actuator to align with the handle or interlock.

In another embodiment, the step of actuating the interlock linear actuator further comprises depressing a button on a remote hand control unit.

A method of replacing a circuit breaker in a circuit breaker cabinet related to the apparatus described herein can include the steps of: remotely actuating a foot lever interlock on a circuit breaker in a circuit breaker cabinet; remotely pulling the circuit breaker out of the circuit breaker cabinet; providing a visual indication the circuit breaker is fully removed; remotely pushing a replacement circuit breaker into the circuit breaker cabinet; and providing a visual indication the replacement circuit breaker is fully installed.

Referring now to the Figures, FIG. 1A shows a right side view of the circuit breaker replacement tool.

In this Figure, cart (10) has a base plate (12). The base plate (12) can be powder coated with a static resistant coating. A first large wheel (14) is shown, mounted to one side of the base plate (12). A second large wheel (16), best seen in FIG. 1B, which can have an identical diameter is shown mounted to the other side of the base plate (12). The wheels (14, 16) can have steel hubs, coated to resist static build up with rubber tires to insulate the cart (10).

The cart has a cart right side (18) and a cart left side (20). The cart left side can best seen in FIG. 1B. The cart right side (18) can be made from a right front tube (22a) connected to a right back tube (24a) using multiple right side braces, shown here as right side braces (34a, 34b, 34c), and a right curved handle (26a). The braces can be about 2 inches wide, about ¼ inches thick, and about 6 inches long and can be made of static charge resistant coated material, which in one embodiment can be painted steel. However, the cart can be entirely made from a sturdy polymer material for light weight shipping and charge carrying resistance.

The cart left side (20), best seen in FIG. 1B, can be made from a left front tube (22b) connected to a right back tube (24b) using multiple left side braces, shown here as left side braces (36a, 36b, 36c), and a left curved handle (26b). The braces can be about 2 inches wide, about ¼ inches thick, and about 6 inches long and can be made of static charge resistant coated material, which in one embodiment can be painted steel. However, the cart can be entirely made from a sturdy polymer material for light weight shipping and charge carrying resistance.

The base plate is further shown having a first vertical side (38) and a second vertical side (40), parallel to and opposite the first vertical side. The second vertical side (40) can best be seen in FIG. 1B.

The cart has a right side plate (28a) with right side height adjusting holes (30a, 30b, 30c, 30d) engaging the base plate at about a 90 degree angle and running parallel to the first vertical side (38).

The cart has a left side plate (28b), best seen in FIG. 1B, with left side height adjusting holes (32a, 32b, 32c, 32d) engaging the base plate at about a 90 degree angle and running parallel to the second vertical side (40).

The circuit breaker replacement tool can have a height adjustable support arm (42) disposed between the right and left side plates (28a, 28b). The height adjustable support arm (42) can be mounted to the left and right side plates (28a, 28b) at various heights with a height adjusting connection rod (44).

The height adjusting connection rod (44) can be adapted to disconnect and reconnect in the corresponding height adjusting holes located in the left and right side plates (28a, 28b) at different heights. The height adjusting connection rod (44) can be connected and disconnected in a variety of ways including with pins, or with spring loaded members which can snap into the each set of corresponding height adjustment holes (32a, 32b, 32c, 32d).

The height adjustable support arm (42) can further have an extendable central rod (46) made up of a first hollow portion (48a), a second hollow portion (48b) and a cabinet brace (50). The first hollow portion (48a) can have a diameter larger than the second hollow portion (48b). Alternatively, the height adjustable support arm (42) can have a central axle.

A cabinet brace (50) can be removably secured to the extendable central rod (46). The cabinet brace (50) can be threaded to the extendable central rod (46), but it can also be secured by other means such as by bolts or by cotter pins. The cabinet brace (50) can generally be orientated perpendicularly to the extendable central rod (46) and can best be seen in FIG. 3. The cabinet brace (50) has two ends which can be spring loaded to extend outward. This extension can be configured to secure the cabinet brace (50) on the to a circuit breaker cabinet.

A main linear actuator (52) having a housing (54) can be secured to the extendable central rod (46). A movable shaft (56), can be disposed within the housing (54). The movable shaft (56) can have a housing end (58) and an exposed end (60). The housing (54) can have a hole, a welded bracket attached with a pin or screw to that hole, where the welded bracket can allow the main linear actuator to pivot at the bracket connection.

FIGS. 1A and 1B illustrates three limit switches (72, 74, 76) is shown disposed on the housing (54). In one embodiment, at least one of the three limit switches (72, 74, 76) can stop movement of the main linear actuator. While there can be more than three, or less than three limit switches, the limit switches can also be omitted.

An adapter drive head (62) can be connected to the exposed end (60) of the movable shaft (56). An interlock linear actuator mounting plate (78) can be slidably mounted to the adapter drive head (62) between the mounting adapter (80) and the adapter drive head (62). An interlock linear actuator mounting adapter (80) can be rotatably connected to the linear actuator mounting plate (78) to receive an interlock linear actuator (64) for mounting with an interlock linear actuator housing (66).

The interlock linear actuator (64) can have an interlock shaft (68) connected within the interlock linear actuator housing (66). An interlock head (70) can be mounted to the interlock shaft (66).

A control box (82) can be secured to the cart (10) for supplying power to and control signals to the main linear actuator (52). A power supply (84) is depicted inside the control box (82). A hand control unit (86) connected to the control box (82) can be used to operate the main linear actuator (52) and the interlock linear actuator (64). The hand control unit (86) is depicted connected to a control box (82), but the hand control unit (86) can be in wireless communication with the control box (82). A battery charger (88) can be used to recharge the power supply (84).

The control box (82) is depicted connected to the hand control unit (86) by a remote communication cable (90). The remote communication cable (90) can enable an operator to operate the drive assembly from a distance, such as at least 20 feet away from the circuit breaker, in order to improve safety conditions for a user. The communication cable (90) can be a spiraled cable or a straight cord. The communication cable can be a coaxial cable or a straight pair or bundle of wires. The cable only needs to be capable of transmitting electrical signals from the hand control remote to the control box (82).

The cart has a first front wheel (92) connected to the base plate and a second front wheel (94). It is contemplated that the two front wheels can have a diameter smaller than the two back wheels, by more than about 50 percent and up to about 70 percent. More than two back wheels and more than two front wheels can be used to create a multi-wheel assembly.

A light tower (140) containing a first light (142), a second light (144) and a third light (146) can be mounted on top of the control box (82) and electrically connected to the each of the limit switches (72, 74, 76) in the main linear actuator (52). The limit switches (72, 74, 76) can communicate the position of the movable shaft (58) which can be visually indicated by the light tower (140). For example, the first light (142) can be a red light which can be illuminated when the circuit breaker is fully installed. The second light (144) can be an amber light which can be illuminated when the circuit breaker is in a test position (146). The third light can be a green light which can be illuminated when the circuit breaker is fully removed. The light tower (140) can provide additional safety to operators installing and removing circuit brakes by providing visual indication of the circuit breakers location, however it can be appreciated embodiments of the tool are envisioned to work without any such light tower.

FIG. 2 depicts a top view of the control box (82). The control box (82) has a power supply (84) which can be a 12-Volt rechargeable sealed lead-acid battery. For example, a battery from Panasonic model number LC-R127R2P can be used. Two batteries can be connected in series to give a total power supply of about 24 volts. The control box can be seen partially surrounded by a the right front tube (22a) connected to a right back tube (24a) with bracer (34b) and the left front tube (22a) connected to a left back tube (24a) with bracer (36b).

The control box (82) has a power supply charger (88) in communication with the power supply (84). The power supply charger (88) can further contain LEDs (150) which can indicate the charge of the power supply (84). The power supply charger (88) is illustrated as externally mounted to the control box (82), but it can be appreciated that the power supply charger (88) can also be located on the interior of the control box (82).

The control box (82) is further illustrated with a an auxiliary connection (134) which provides a connection for the interlocking linear actuator (64). The auxiliary connection (134) can provide power to other peripheral devices.

The control box (82) can have a power on indication lamp (100). The power on indication lamp (100) indicates that the circuit breaker replacement tool is turned on. Power on switch (102) can be used to power up the circuit breaker replacement tool. The upper most portion of the light tower (140) can be seen in this Figure as well As better illustrated in FIG. 1A, the control box (82) can be connected to a hand control unit (86) by a remote communication cable (90). An automatic shut-off can be integrated with the hand control unit (86).

As better illustrated in FIG. 1A, the control box (82) is connected to the main linear actuator (52), by a first cable (98). The first cable (98) can also provide power to the interlock linear actuator (64).

FIG. 3 depicts a top view of one end of the height adjustable support arm (42), which includes the cabinet brace (50) at one end. A first spring (104) is disposed within the cabinet brace (50) between a first cabinet brace end (108) and the cabinet brace (50). A second spring (106) is disposed within the cabinet brace (50) between the second cabinet brace end (110) and the cabinet brace (50). The first and second cabinet brace ends (108, 110) are illustrated as relatively "U-shaped." This configuration is good for gripping portions of the circuit breaker cabinet and for reducing any motion of the cabinet brace (50) by providing a slidable engagement to the circuit breaker cabinet. Although other configurations can be used in different circumstances, for example a flat surface or an "L-shape" may be used if the brace end must rest against a wide flat surface. In an additional embodiment the adjustable support arm can be H-shaped.

The cabinet brace (50) is depicted mounted to the height adjustable support arm (42), which contains a first hollow portion (48a) and a second hollow portion (48b), with a bolt. The cabinet brace can also be mounted to the height adjustable support arm by a screw, a weld, or other mounting means. The cabinet brace (50) can also be hollow in order to increase the each with which it can be manipulated. The cabinet brace can also be constructed from a single integral piece.

In an embodiment, the cabinet brace can further comprise a first cabinet brace end slidably engaging the cabinet brace and a second cabinet brace end slidably engaging the cabinet brace for holding a cell or a circuit breaker cabinet comprising a plurality of cells.

Figure 4:
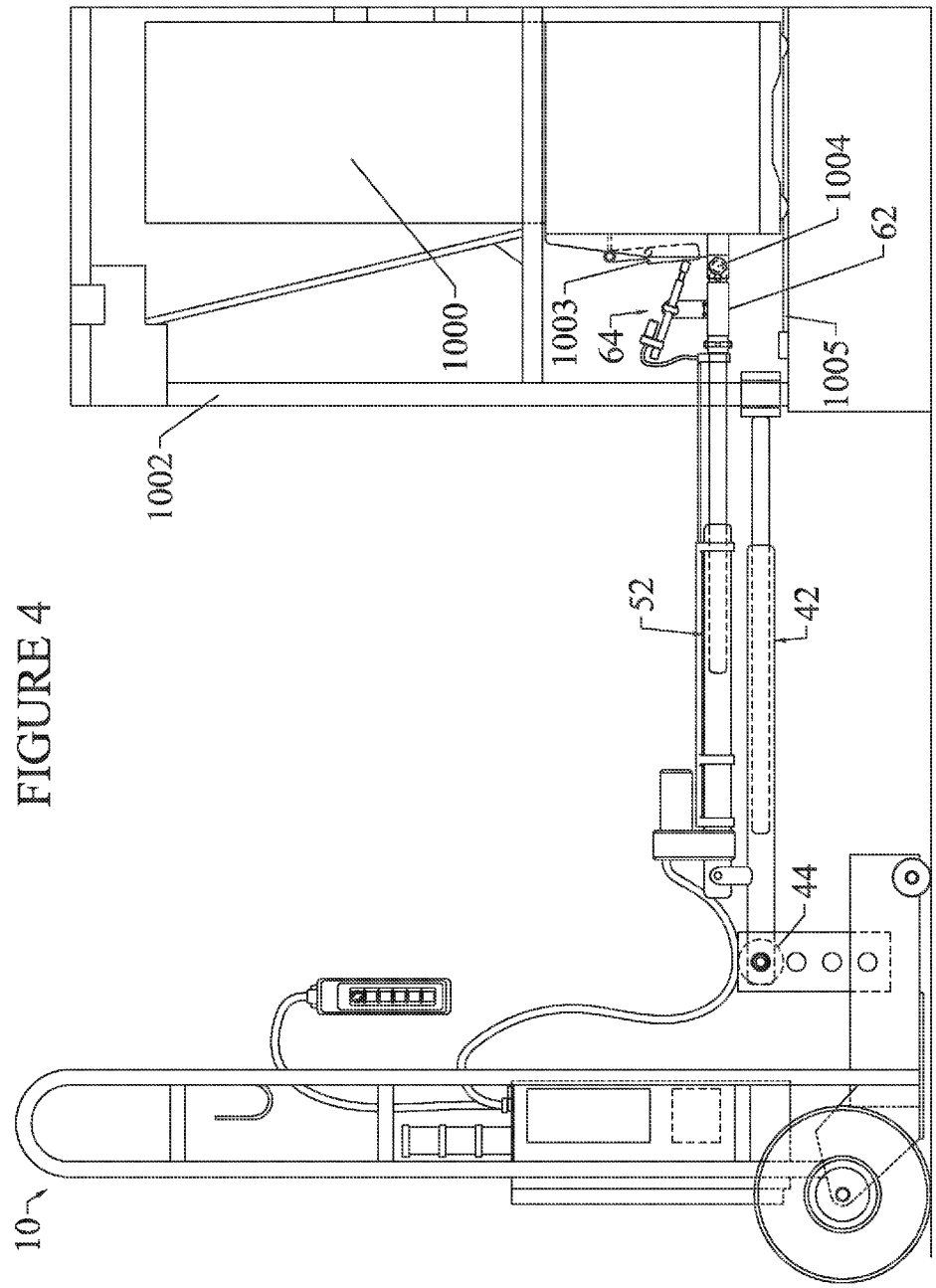
FIG. 4 is a side view of the tool engaging a circuit breaker.

FIG. 4 illustrates a right side view of the circuit breaker replacement tool, including a cart (10) with a main linear actuator (52), which is substantially similar to the circuit breaker replacement tool depicted in FIGS. 1A and 1B, engaging a circuit breaker (1000). In contrast to FIGS. 1A and 1B, the height adjustable support arm (42) has been adjusted by its height adjusting connection rod (44) into the higher adjustment holes in order to be level with the base of the circuit breaker cabinet (1002).

The adapter drive head (62) is depicted engaged with the circuit breaker (1000) for removing or installing the circuit breaker (1000). A bolt (1004) is depicted fastening the adapter drive head (62) to a portion of the circuit breaker (1000). The circuit breaker (1000) can be in a circuit breaker cabinet (1002). The circuit breaker (1000) can be secured well below its center of gravity which allows the main linear actuator to more easily retract the circuit breaker along its track (1005).

The interlock linear actuator (64) is also shown engaged with a foot lever (1003) of the circuit breaker (1000). FIG. 4 illustrates the interlocking linear actuator (64) depressing a foot lever (1003) to release the circuit breaker (1000) from the circuit breaker cabinet (1002).

With the foot lever (1003) depressed, the main linear actuator (52) can begin to withdraw the circuit breaker (1000) from the circuit breaker cabinet (1002).

Figure 5:
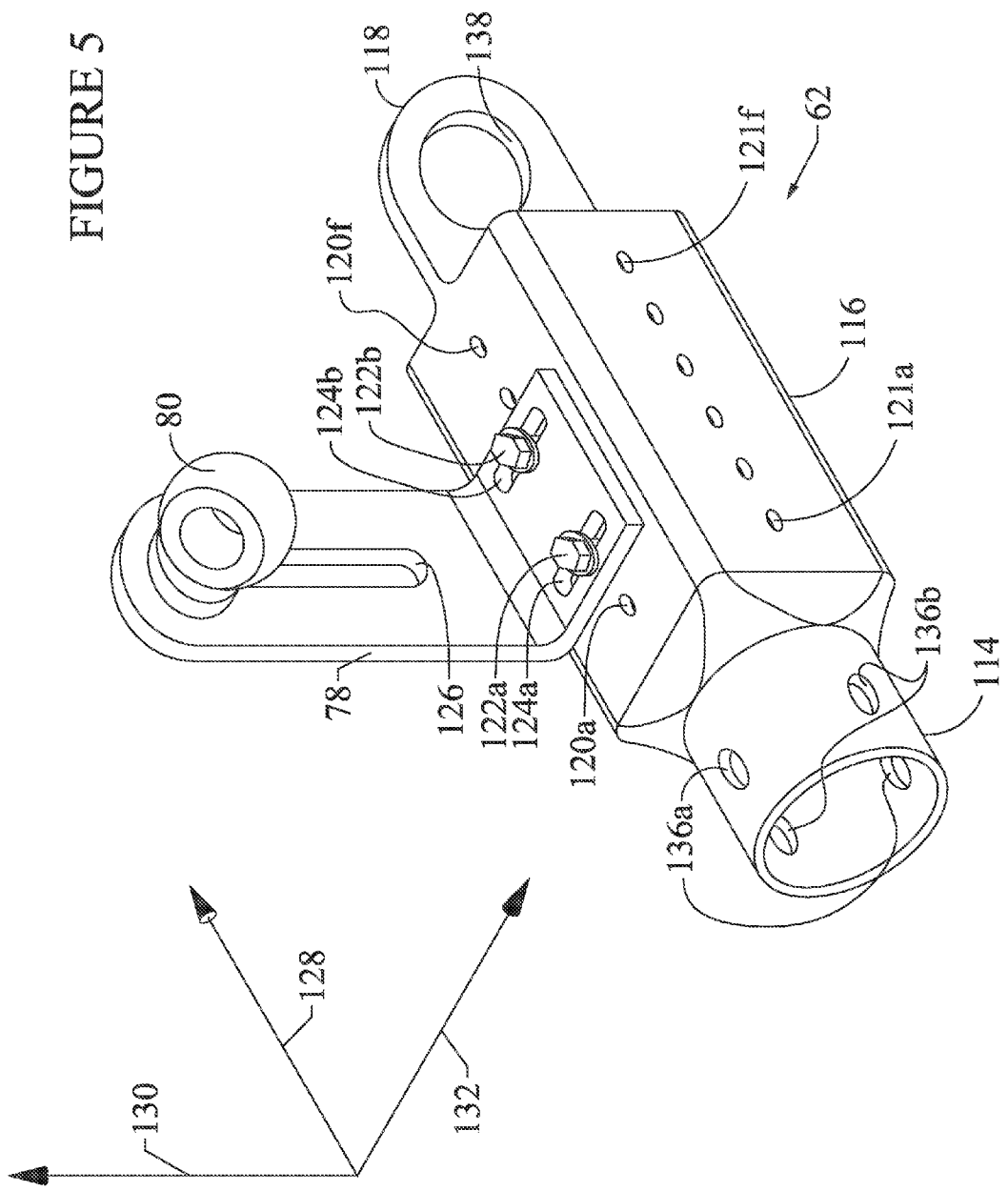
FIG. 5 is an isometric view of the adapter drive head.

FIG. 5 depicts an isometric view of an embodiment of the adapter drive head (62). The adaptor drive head (62) comprises a pin end (114) for engaging the main linear actuator (52), which can be seen in FIGS. 1A and 1B, a body (116) integral with the pin end (114), and a head end (118) integral with the body (116), wherein the pin end (114) and the head end (118) are disposed in the same plane. The pin end (114) and the head end (118) can also be orientated about 90 degrees from the same plane. Alternative angles can be applied in order to accommodate various circuit breakers and circuit breaker cabinets.

The pin end (114) of the adapter drive head (62) has at least ones set of holes (136a, 136b) for mounting to the main linear actuator (52), as seen FIGS. 1A and 1B. A first set of holes (136a) is designed to receive a pin, a fastener or some other means for securing the adapter drive head (62) to the main linear actuator (52). The first set of holes (136a) can be orientated directly across from each other in order to receive a locking member, such as a pin. A second set of holes (136b) is illustrated having an axis generally perpendicular to the axis formed by the first set of holes (136a). The second set of holes (136b) allow the adapter drive head (62) to attach to the main linear actuator (52) at an angle other than that presented by the first set of holes (136a). This configuration presents different angles of the head end (118) for mounting with circuit breaker cabinets (1002), which can require a variety of configurations. Additionally, numerous sets of holes can be provided in the pin end (114) of the adapter drive head for providing a number of mounting configurations.

For example, the adaptor drive head (62) can comprise a pin end (114), for engaging the main linear actuator (52), a body (116) integral with the pin end (114), and a head end (118) integral with the body (116), wherein the pin end (114) and the head end (118) are disposed in planes perpendicular to each other. The head end (118) is illustrated with a single hole (138), but the head can be constructed with a plurality of holes, including holes of various sizes.

The adapter drive head (62) can be mounted to the main linear actuator (52) by a cotter pin, a bolt, a screw or another mounting means.

The body (116) of the adapter drive head (62) can comprise a plurality of threaded engagement holes (120a, 120b, 120c, 120d, 120e, 120f), only some of which are visible in FIG. 5, each for receiving a fastener (122a, 122b) for engaging the interlock linear actuator mounting plate (78). The fastener (122a, 122b) can be a screw with a flat head, a Phillip's head, or a Allen head. Other head configurations known to those of ordinary skill in the art can be used in conjunction with the appropriate tools. The threaded engagement holes (120a, 120b, 120c, 120d, 120e, 120f) can be placed in equal intervals along a first axis (128).

The adapter drive head (62) can have a plurality of threaded engagement holes (120a, 120b, 120c, 120d, 120e, 120f) on at least one side, but can have a plurality of threaded engagement holes on more than one side enabling the interlock linear actuator mounting plate (78) to be mounted on more than one side of the adapter drive head (62). For example, if an interface with a circuit breaker required a different orientation, the adapter head (62) can be mounted to the linear actuator (52) through the second set of holes (136b) on the pin end (114). The top surface and a side surface of the body (116) can rotate orienting a second set of threaded engagement holes (121a, 121b, 121c, 121d, 121e, 121f) to become the new top surface the body (116).

The interlock linear actuator mounting plate (78) has a pair mounting slots (124a, 124b). The mounting slots (124a, 124b) can run parallel to one another and can be spaced apart from one another at a distance that corresponds with the threaded engagement holes (120a, 120b, 120c, 120d, 120e, 120f).

The mounting slots (124a, 124b) allow the interlock linear actuator mounting plate (78) to be moved to any point along a second axis (132) within the length of the mounting slots (124a, 124b) before being mounted to the adapter drive head (62).

The interlock linear actuator mounting plate (78) can be mounted to the body (116) of the adapter drive head (62) along the first axis (128) in any of the threaded engagement holes (120a, 120b, 120c, 120d, 120e, 120f) to allow for a wide variety of mounting positions along the first axis (128).

The interlock linear actuator mounting plate (78) can also contain a vertical mounting slot (126) to which the interlock linear actuator mounting adapter (80) can be mounted. The interlock linear actuator mounting adapter (80) can be mounted to the vertical mounting slot (126) at any point along a third axis (130), within the length of the vertical mounting slot (126), before being mounted to the interlock linear actuator mounting plate (78).

Figure 6:
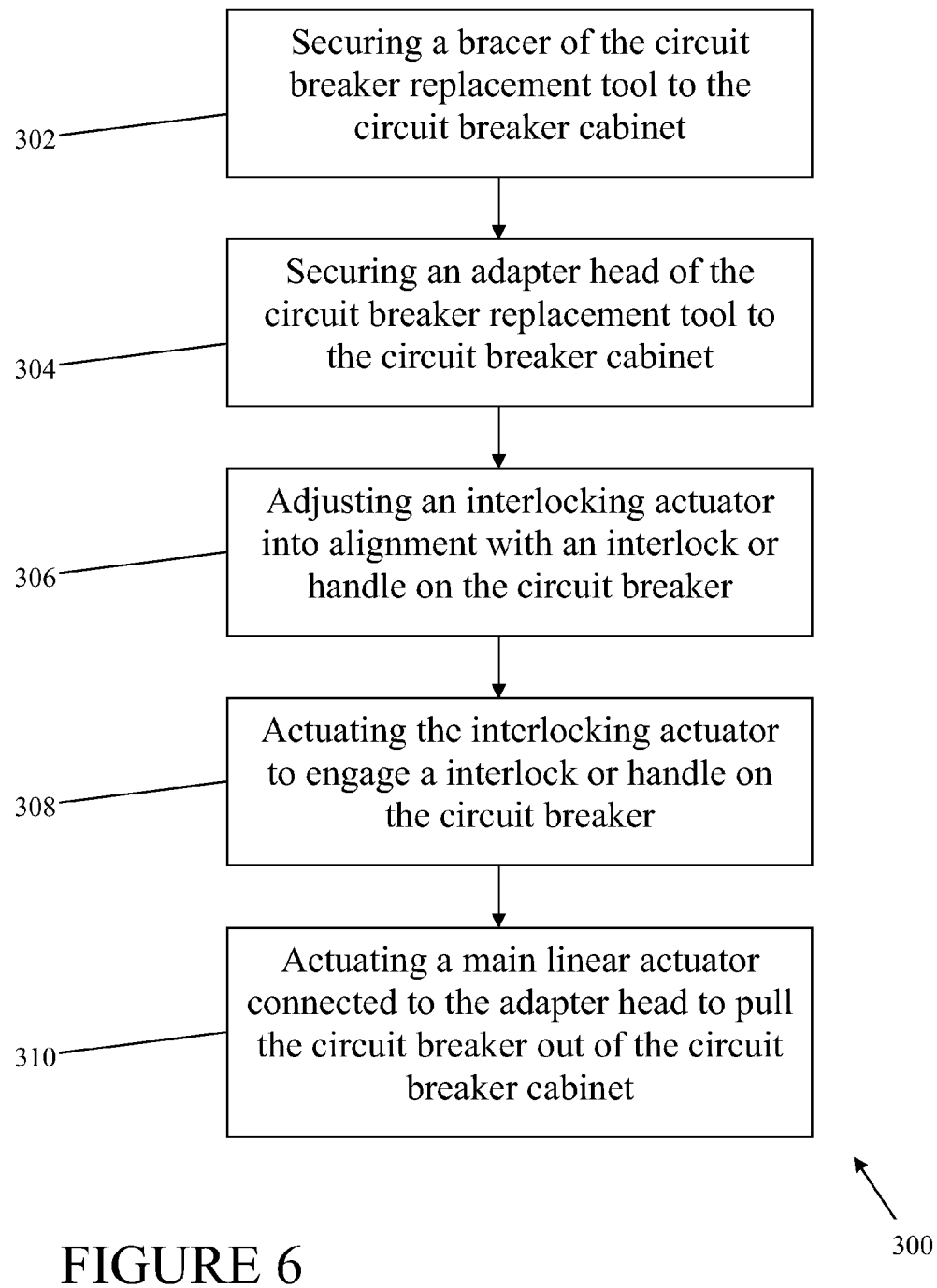
FIG. 6 illustrates a flowchart of a method for replacing a circuit breaker.

FIG. 6 illustrates a flowchart representing a method for removing a circuit breaker (300). First, a brace of the tool is secured to the circuit breaker cabinet, providing a rigid connection to both the circuit breaker and the circuit breaker cabinet which will assist in separating the two (302).

An adapter head of the circuit breaker replacement tool is secured to the circuit breaker cabinet (304). The interlock linear actuator can be adjusted into alignment with an interlock or a lever on the circuit breaker (306). Adjusting the interlock linear actuator can comprise adjusting the position of the interlocking actuator along its own axis, adjusting the height of the interlocking actuator on the interlock linear actuator mounting plate, and pivoting the axis of the interlock linear actuator with mounting adapter. Making the adjustment after the adapter head has been secured to the circuit breaker is beneficial in that the tool and the circuit breaker will move very little relative to each other after that time.

The interlock linear actuator is activated to engage an interlock or handle on the circuit breaker (308).

The actuating main linear actuator is activated to start removing the circuit breaker from the circuit breaker cabinet (310).

In an embodiment the step of actuating the interlock linear actuator and/or the step of actuating the main linear actuator can include the step of remote activation. Remote activation can be accomplished by depressing a button on a remote hand control unit.

In one embodiment the step of adjusting the interlock linear actuator can include the steps of: adjusting the position of the interlock linear actuator along its own axis; adjusting the height of the interlock linear actuator; and pivoting the axis of the of the interlock linear actuator to align with the handle or interlock.

Figure 7:
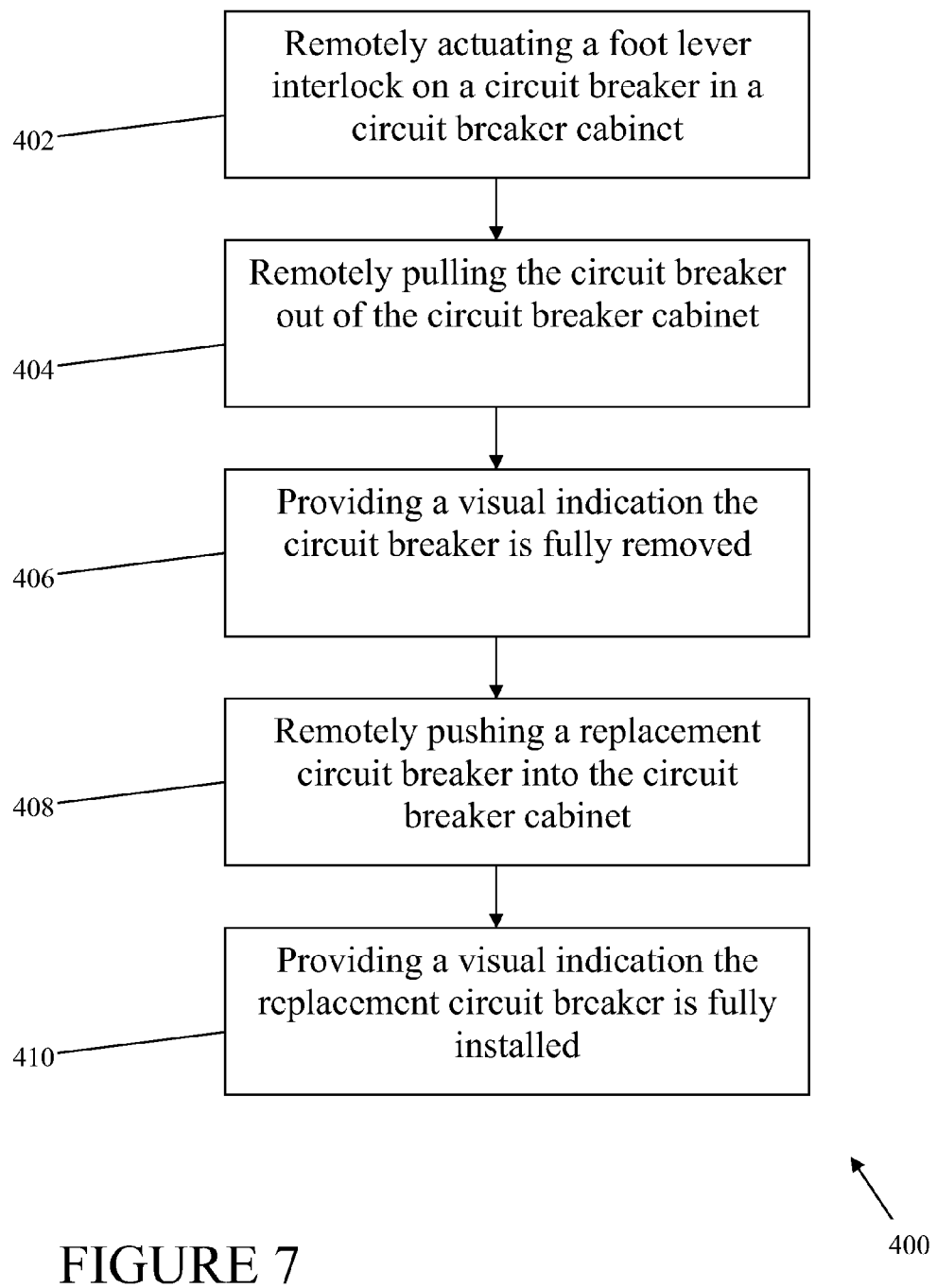
FIG. 7 illustrates a flowchart of a method for replacing a circuit breaker.

FIG. 7 generally illustrates an embodiment of a method for replacing a circuit breaker in a circuit breaker cabinet (400). First, the foot lever interlock on a circuit breaker in a circuit breaker cabinet is remotely actuated (402). Once the foot lever has been actuated the circuit breaker is remotely pulled out of the circuit breaker cabinet (404). Next, a visual indication is provided when the circuit breaker has been fully removed from the circuit breaker cabinet (406).

A replacement circuit breaker can be remotely pushed into the circuit breaker cabinet (408), and then a visual indication is provided that the replacement circuit breaker is fully installed (410). It should be appreciated that these visual indicia can be lights such as those on the light tower previously described or they can be LEDs which can communicate the same information.

While these embodiments have been described with emphasis on the embodiments, it should be understood that within the scope of the appended claims, the embodiments might be practiced other than as specifically described herein.

What is claimed is:

1. A circuit breaker replacement tool comprising:
   a. a cart comprising a base plate wherein the base plate is disposed between a first wheel and a second wheel;
   b. a right side plate with right side height adjusting holes engaging the base plate;
   c. a left side plate with left side height adjusting holes engaging the base plate;
   d. a height adjustable support arm comprising:
      i. a height adjusting connection rod adjustably disposed between the right side height adjusting holes and the left side height adjusting holes, wherein the height adjusting connecting rod is adapted to disconnect and reconnect in the different height adjusting holes at different positions;
      ii. an extendable central rod fixedly secured to the height adjusting connection rod; and
      iii. a cabinet brace removably secured to the extendable central rod;
   e. a main linear actuator having a housing secured to the extendable central rod and a movable shaft disposed within the housing further having a housing end and an exposed end;
   f. an adapter drive head mounted to the exposed end of the movable shaft, wherein the adapter drive head is adapted to engage a circuit breaker;
   g. an interlock linear actuator with a interlock linear actuator housing further having an interlock shaft in the housing and a interlock head connected to the interlock shaft;
   h. an interlock linear actuator mounting adapter engaging the interlock linear actuator housing;
   i. an interlock linear actuator mounting plate disposed between the mounting adapter and the adapter drive head; and
   j. a control box connected to the cart for supplying power to, and control signals to, the main linear actuator the interlock linear actuator, comprising:
      i. a power supply;
      ii. a power supply charger in communication with the power supply;
      iii. a hand control unit with a remote communication cable for engaging the control cabinet; and
      iv. an auxiliary connection.

2. The circuit breaker replacement tool of claim 1, further comprising up to three limit switches connected to the main linear actuator and wherein at least one stops movement of the main linear actuator.

3. The circuit breaker replacement tool of claim 1, wherein the adaptor drive head comprises a pin end for engaging the main linear actuator, a body integral with the pin end and a head end integral with the body, wherein the pin end and the head end are disposed in the same plane.

4. The circuit breaker replacement tool of claim 1, wherein the adaptor drive head comprises a pin end for engaging the main linear actuator, a body integral with the pin end, and a head end integral with the body, wherein the head end is oriented 90 degrees from a pin end.

5. The circuit breaker replacement tool of claim 3, wherein the pin end has at least one hole and the head end has a plurality of holes.

6. The circuit breaker replacement tool of claim 4, wherein the body comprises a plurality of threaded engagement holes each for receiving a fastener for engaging the interlock linear actuator mounting plate.

7. The circuit breaker replacement tool of claim 1, wherein the cabinet brace is hollow.

8. The circuit breaker replacement tool of claim 7, wherein the cabinet brace further comprises a first cabinet brace end slidably engaging the cabinet brace and a second cabinet brace end slidably engaging the cabinet brace for holding a cell or a circuit breaker cabinet comprising a plurality of cells.

9. The circuit breaker replacement tool of claim 7, wherein the cabinet brace is a one piece construction.

10. The circuit breaker replacement tool of claim 8, wherein a first spring is disposed within the cabinet brace and between the first cabinet brace end and the cabinet brace and a second spring disposed within the cabinet brace between the second cabinet brace end and the cabinet brace.

11. The circuit breaker replacement tool of claim 1, wherein the height adjustable support arm is telescoping.

12. The circuit breaker replacement tool of claim 1, wherein the height adjustable support arm has an "H-shape".

13. A method of replacing a circuit breaker in a circuit breaker cabinet comprising the steps of:
    a. securing a bracer of a circuit breaker replacement tool to the circuit breaker cabinet;
    b. securing an adapter head of the circuit breaker replacement tool to the circuit breaker cabinet;
    c. adjusting an interlock linear actuator into alignment with an interlock or handle on the circuit breaker;
    d. actuating the interlock linear actuator to engage the interlock or handle on the circuit breaker; and
    e. actuating a main linear actuator connected to the adapter head to pull the circuit breaker out of the circuit breaker cabinet.

14. The method of claim 13, wherein the step of actuating the interlock linear actuator further comprise depressing a button on a remote hand control unit.

15. The method of claim 13, wherein the step of adjusting the interlock linear actuator includes the steps of:
    a. adjusting the position of the interlock linear actuator along its own axis;
    b. adjusting the height of the interlock linear actuator; and
    c. pivoting the axis of the interlock linear actuator to align with the handle or interlock.

* * * * *